Feb. 19, 1924. Re. 15,772
W. C. STEVENS
METHOD AND APPARATUS FOR MANUFACTURING TIRES
Original Filed Oct. 10, 1918 2 Sheets-Sheet 1
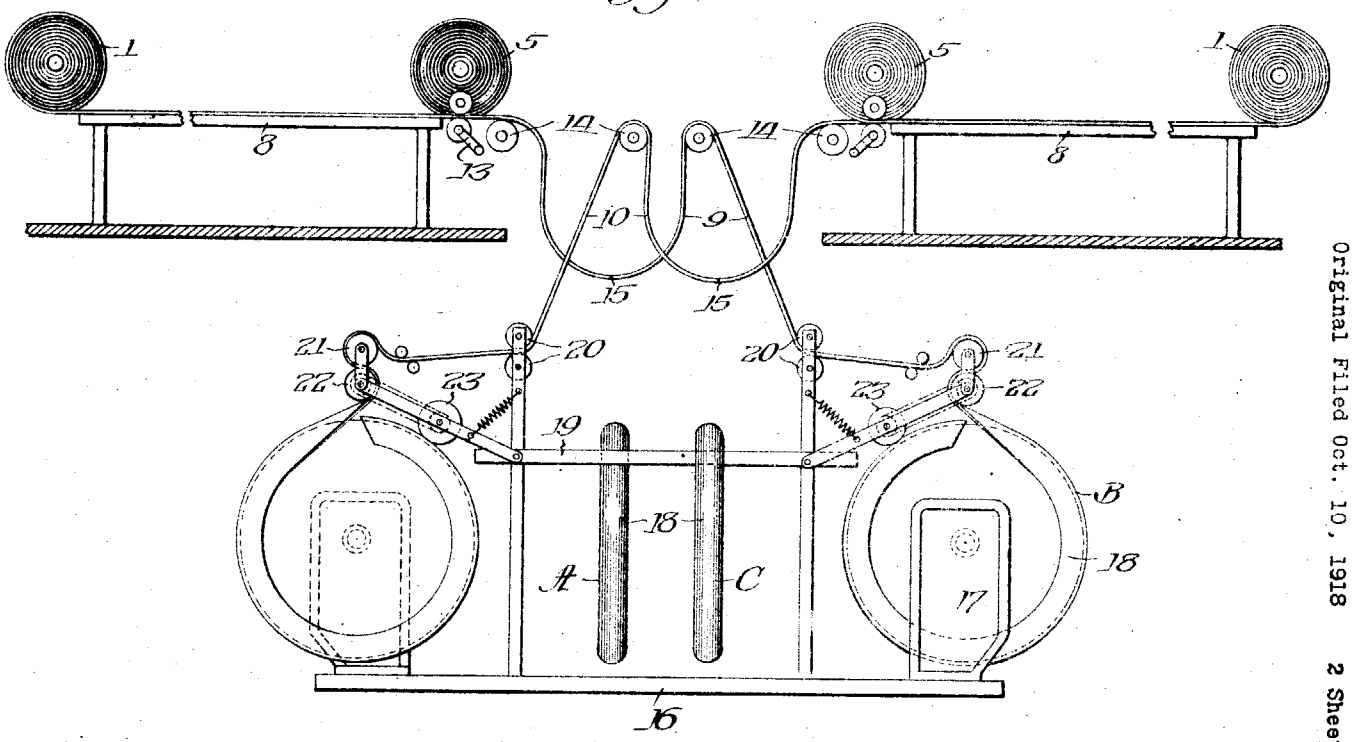
Witness:
Fred C. Dawson
Inventor
William C. Stevens,
By G. P. Ely Atty Feb. 19, 1924.
Re. 15,772
W. C. STEVENS
METHOD AND APPARATUS FOR MANUFACTURING TIRES
Original Filed Oct. 10, 1918 2 Sheets-Sheet 2
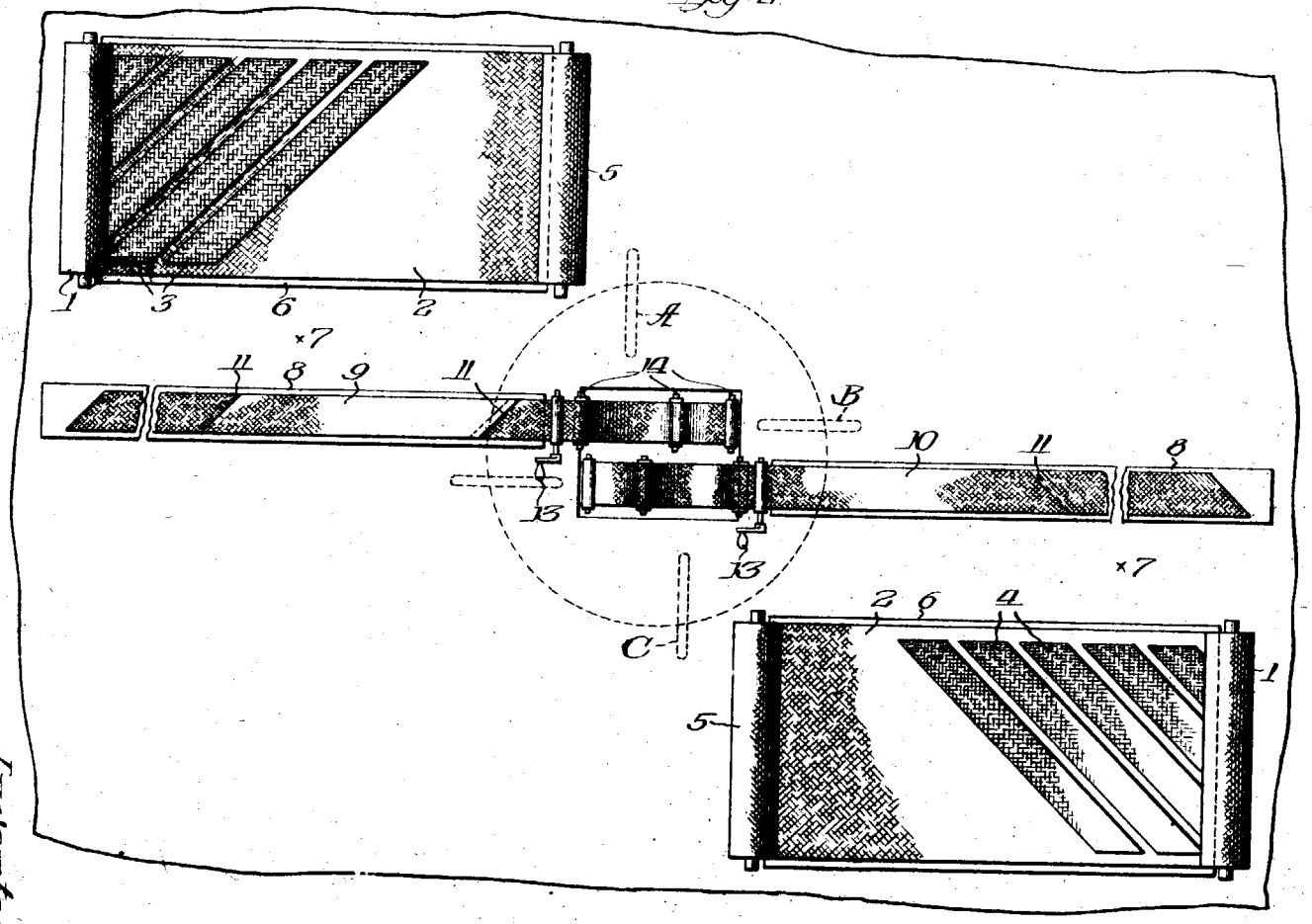
Witness:
Inventor
William C. Stevens
By G. P. Cly Atty.

Reissued Feb. 19, 1924. Re. 15,772

UNITED STATES PATENT OFFICE.

WILLIAM C. STEVENS, OF AKRON, OHIO, ASSIGNOR TO THE FIRESTONE TIRE AND RUBBER COMPANY, OF AKRON, OHIO, A CORPORATION OF OHIO.

METHOD AND APPARATUS FOR MANUFACTURING TIRES.

Original No. 1,398,749, dated November 29, 1921, Serial No. 257,638, filed October 10, 1918. Renewed April 23, 1921, Serial No. 463,904. Application for reissue filed June 11, 1923. Serial No. 644,813.

*To all whom it may concern:*

Be it known that I, WILLIAM C. STEVENS, a citizen of the United States, residing at Akron, in the county of Summit, State of Ohio, have invented certain new and useful Improvements in Methods and Apparatus for Manufacturing Tires, of which the following is a specification.

The invention has for its object a new and improved method for manufacturing tires, and the apparatus for this purpose, which will enable tires to be manufactured more cheaply than at present, by reducing the amount of handling necessary in getting the fabric to the machine, in presenting the fabric to the machine in fresh and perfect condition, and in forming a reserve or storage supply for the fabric between the point of supply and the core.

In the drawings accompanying this application, there is shown diagrammatically the layout of apparatus to accomplish the purposes of the invention, but it will be understood that the particular design is not essential and may be changed within the limits of the invention.

Figure 1 is a view in side elevation; and Figure 2 is a plan view.

In the manufacture of automobile tires by present factory methods, the fabric from which the tire is manufactured is given a friction coat of rubber compounds on both sides and then given a skim or surface coat on one side by means of calenders. The fabric is then taken to the bias cutter where it is cut into strips at an angle of 45° as is required in the manufacture of the casings. At the bias cutter the fabric strips are placed in books or rolled up in a liner to keep the rubberized fabric from mutual contact. The books referred to are boards on which are secured a number of layers of liner by one long edge. Each strip of rubberized fabric is placed between the layers or leaves of the "books." The books or rolls in which the bias strips are held are then taken to an assembling table at which point the fabric strips are placed end to end, being firmly spliced, or rolled together, so that a straight length of bias cut fabric is formed, which is then rolled up in a long narrow liner on a drum. This drum of liner and fabric rolled together is placed on the machine.

In place of using the books or rolls of fabric intermediate the bias cutter and the assembling tables it is possible to bring the bias cut fabric directly from the bias cutter to the assembling table.

The drums on which the fabric and liner are rolled constitute an expensive item in the operation of a tire factory and as the drums are not taken directly from the assembling tables to the machines, considerable space is required for their storage. The fabric for different kinds and sizes of tires is of different widths and it is necessary to tag the rolls and keep an accurate record of them, which requires considerable clerical force. Furthermore, as the rolls stand, the liner becomes stuck to the tacky rubber coating making its removal difficult and often causing injury to the skim coat, which is detrimental to the finished tire. Considerable time is often wasted at the tire machine in separating the liner from the fabric.

During the building of a tire care must be exercised on the part of the tire builder that splices do not pile up, that is, become superimposed in the building of the carcass, and while the fabric is rolled up between the turns of the liner, it is impossible to locate the splices, and frequently the splices pile up in a tire necessitating the rebuilding of it, or the operator unrolls the fabric and tries to determine the location of the splices, which operation consumes valuable time at the machine.

By the method herein disclosed all of the difficulties experienced in the handling of the tire fabric are obviated, as it is the purpose of my invention to run the fabric direct from the assembling table to the tire machine, and for this object it is necessary to provide a new combination of elements in a tire factory.

By practising my invention it is possible to make provision for a storage supply of fabric between its source and the tire core, so that when the core is to be rotated to wind the fabric thereon, a quantity of the fabric will be in position to be withdrawn by the core without necessarily drawing upon the fabric supply at its source, it being possible to replenish the withdrawn fabric during the intervals in which the core is not drawing upon the fabric. In this manner fabric is always freely available to the operator and is preferably in view of the operator for the purpose of positioning splices and the like.

In the drawings 1 represents the roll of fabric and bias strips as they are received from the bias cutter, the liners being designated by the numeral 2 and the strips by the numerals 3 and 4. It will be understood that the rolls may be eliminated and the bias cut fabric led directly from the cutter to the assembling tables. As the fabric is generally required to be of two different widths in a tire carcass owing to its position relative to the bead, there are shown two separate rolls of fabric and liner, the fabric 3 being slightly narrower than the fabric 4. The liner is wound up on the roll 5 after passing over a table 6 upon which a considerable portion of it is exposed carrying the bias strips, skim coat uppermost.

From the upper surface of the table 6 the operator removes the bias strips and places them end to end to form the length of bias fabric from which the tire is made. The table or supporting means upon which the strips are laid is shown at 8 and the two strips of bias fabric are shown at 9 and 10, the former being the narrower strip adapted to form the first or under bead plies, and the latter being the wider strip to form the plies over the bead. In the making up of the strip, the operator rolls down the overlapping ends of the fabric to make a splice shown at 11.

At the end of each table 8 is arranged a pair of feed rolls 12, one of which is provided with a crank 13 so that the operator may pass out the fabric as fast as it is assembled. From the rolls 12 each length of fabric may pass over a pair of idle rolls 14 between which it forms a loop 15 for storage and inspection purposes.

The apparatus is designed to be used with a tire building machine such as shown and described more particularly in my copending application Serial No. 256,429, filed October 1, 1918, certain parts of which machine are shown diagrammatically in the drawings. It is obvious that the invention is not limited for use with such a machine, but may be applicable to other well known or standard machines. The method and apparatus are peculiarly adaptable for a machine of the type shown herein, as in these machines the core occupies one position during the laying of the plies under the bead and another position during the laying of the plies over the bead, as the narrower strips 9 are led directly to the core in the first named position and the wider strips 10 are led to the core in the second named position.

With machines in which the core is fixed in position it is possible to utilize the present invention by having two sources of fabric of differing widths directly accessible from the operator's position and easy of application to the stretching mechanism, which may accompany each machine, or if desirable, only one width of fabric may be used for all the plies, or wide and narrow fabric may be assembled in a single length.

In the particular embodiment which I have shown the tire machine comprises a movable support or table 16 which carries a plurality of supports 17 on which are mounted cores or forms 18. In this particular machine the core occupies four positions during the manufacture of the tire, the first position being shown at A in which the finished tire is inspected and trimmed and a new core substituted for the finished one. The second position is at B in which the first plies of fabric which go under the bead are laid about the core and shaped thereto. The third position is shown at C in which the beads are applied and the fourth position at D in which the last plies of fabric which go over the bead are laid about the core and applied thereto. In order not to have too much detail in the diagrammatic view, the supports for the core in A and C positions have been omitted and the shaping, bead applying, trimming mechanisms, and core rotating mechanisms have been omitted. The means used for moving the support 16 from position to position have also been omitted from the drawing, but it will be understood that each core moves about the machine from position A to position D remaining at each point long enough to have the several operations performed on four cores at the four points. It will be understood that the number of supports and steps in the operation of the machine may be varied without departing from the invention.

Adjacent the movable support, and preferably located within it, is a stationary support 19 which carries a pair of guide rolls 20 which receive the fabric from the last idle roll 14. From the guiding rolls the fabric passes to each core in B and D positions through a pair of stretching rolls 21 and 22 from whence they pass to the rotating core. Any suitable means may be devised for exerting a drag upon the rolls 21 and 22 to stretch the fabric. A braking mechanism may be used, but it is preferred by me to make use of a retarding roll shown at 23 which may be so geared to the rolls 21 and 22 as to exert a determined and measurable stretch to the fabric. The details of the device are not essential to an understanding of this invention and have been omitted from the showing, but attention is directed to my copending application aforesaid for these details.

When the plies of fabric have been stretched around the core, it is cut below the roller 22, and the shaping mechanism, however designed, is brought into play, or the fabric may be shaped by hand. It will be noted that the fabric from the two tables cross in their passage to the machine. This is for the purpose of keeping the skim coat on the upper side of the fabric to facilitate the building of the tire, although this arrangement is not essential as the fabric may be assembled with the skim above and below for the different strips.

By the use of the apparatus herein described, and by practice of the method, the drums on which the fabric strips are rolled up may be dispensed with. It is not necessary to use a liner between the turns of fabric which in itself is a great saving. The fabric is always fresh when delivered to the machine and the skim coat is in perfect condition, not being injured by handling as has been the case heretofore, or by adherence to a liner, which will not only peel off the skim coat, but will delay the operation of the tire machine. Furthermore, the tire machine operator does not have to guess or waste valuable time in investigating the location of the splices as the fabric hangs before him in a long loop and he can locate the splices far enough ahead so as to know where to attach the leading end of the fabric. The loops 15 are of sufficient size to accommodate enough fabric for one operation of the tire machine, and serve as storage points for the fabric between the fabric supply and the tire machine operator from which the latter may draw.

Various changes and modifications may be made in the construction and operation of the apparatus without departing from the spirit of the invention, or sacrificing any of its benefits.

What I claim is:

1. In the process of manufacturing tires, the steps of cutting fabric into a plurality of strips, building a continuous length from said strips, leading said length directly from said forming point to a core, and applying the fabric to the core.

2. In the process of manufacturing tires, the steps of assembling bias strips end to end to form a length of fabric, leading said fabric in a continuous strip directly from said assembling point to a form, and applying the fabric to the form.

3. In the process of manufacturing tires, the steps of assembling bias strips end to end to form a length of fabric, leading said fabric in an uninterrupted strip from the point of assembly to a form, stretching the fabric, and applying it to the form.

4. In the process of manufacturing tires, the steps of assembling the bias strips end to end to form a length of fabric, leading said fabric in an uninterrupted strip from the point of assembly to a form, forming said fabric into a storage supply and stretching said fabric on its way to the form, and applying the fabric to the form.

5. In the process of manufacturing tires, the steps of assembling the bias strips end to end to form a length of fabric, leading said fabric in an uninterrupted strip from the point of assembly to a form, forming in the length of fabric a storage supply, and applying the fabric to the form.

6. In the process of manufacturing tires, the steps of assembling the bias strips end to end to form a length of fabric, leading the fabric in an uninterrupted strip from a source of supply to the tire core, and forming a storage supply in the length of fabric between the fabric supply and the core from which the form may draw its fabric.

7. In an apparatus for building articles of rubberized fabric, the combination of supporting means at which strips of bias fabric are assembled to form a continuous strip, an article building machine, and means for leading a continuous strip from the supporting means to the building machine.

8. An apparatus for the manufacture of tires comprising an assembling table where the fabric is formed into continuous strips from a plurality of individual strips, a tire making machine, and means for conducting the continuous strip from the table to the machine.

9. In an apparatus for the manufacture of tires, the combination of an assembling table whereon the bias fabric is joined end to end to form a strip of fabric, a tire making machine, means for leading said fabric from said table to said tire machine, and means for forming a storage supply of said fabric on the way to said machine.

10. In an apparatus for the manufacture of tires, the combination of an assembling table whereon the bias fabric is joined end to end to form a strip of fabric, a tire making machine including a core, means for leading said fabric from said table to said machine, means for forming a storage supply of said fabric, and means for stretching the fabric prior to its application to the tire core.

11. An apparatus for the manufacture of tires, having a combination of an assembling table whereon the bias fabric is joined end to end to form a strip of fabric, a tire form, means to conduct said fabric strip to the tire form, and a stretching mechanism through which such fabric strip passes on its way to the form.

12. In an apparatus for the manufacture of tires, the combination of a table at which individual strips of fabric are assembled to form a continuous strip, guiding means to conduct said continuous strip from said table, a tire machine including a core, said guiding means conducting said continuous fabric strip directly to said core.

13. In an apparatus for the manufacture of tires, the combination of a table at which individual fabric strips are assembled to form a continuous strip, a tire machine including a core, stretching mechanism on said machine, said stretching mechanism receiving said fabric from the table and delivering it to the core.

14. In an apparatus of the character described, the combination of a support for a core, said support being movable from one position to another, two assembling tables, and means for conducting fabric from said tables to said core in its two positions respectively.

15. In an apparatus of the character described, the combination of a support for two core, said support being movable to transfer said cores from one position to another, two assembling tables, and means for conducting fabric from said tables to said cores.

16. In an apparatus of the character described, the combination of a support for two cores, said support being movable to transfer said cores from one position to another, two assembling tables, means for conducting fabric from said tables to said cores, and means for forming a storage supply of said fabric between the tables and the cores.

17. In an apparatus of the character described, the combination of a support for a plurality of cores, said support being movable to shift said cores, two assembling tables, means for conducting fabric from said tables to said cores, and stretching mechanism for fabric from each table.

18. In an apparatus of the character described, the combination of a support for a plurality of cores, said support being movable to shift said cores, two assembling tables, means for conducting fabric from said tables to said cores, a stationary support and stretching mechanism for said fabric in two positions of said cores carried upon said stationary support.

19. In an apparatus of the character described, the combination of a support for a plurality of cores, said support being movable to shift said cores, two assembling tables, means for conducting said fabric from said tables to the cores, means for forming a storage supply of fabric, a stationary support, and stretching mechanisms for said fabric in two positions of said cores carried upon said stationary support.

WILLIAM C. STEVENS.